United States Patent [19]

Nüssen et al.

[11] Patent Number: 5,376,416
[45] Date of Patent: Dec. 27, 1994

[54] PROCESS FOR THE PRODUCTION OF CLOSURES FOR PACKAGING CONTAINERS

[75] Inventors: Peter Nüssen, Ritterhude; Siegfried Krause, Münster, both of Germany

[73] Assignee: BASF Lacke + Farben Aktiengesellschaft, Munster, Germany

[21] Appl. No.: 30,157

[22] PCT Filed: Jul. 18, 1991

[86] PCT No.: PCT/EP91/01345
§ 371 Date: Apr. 6, 1993
§ 102(e) Date: Apr. 6, 1993

[87] PCT Pub. No.: WO92/02592
PCT Pub. Date: Feb. 20, 1992

[30] Foreign Application Priority Data

Aug. 10, 1990 [DE] Germany .............. 4025327

[51] Int. Cl.⁵ .................. B65D 53/00
[52] U.S. Cl. .................. 428/35.7; 206/524.6; 270/200; 270/361; 270/364; 156/69; 156/275.3
[58] Field of Search ............ 428/35.2, 35.7; 525/453, 28, 38; 206/524.6; 220/200, 361, 364, DIG. 11; 156/69, 275.3

[56] References Cited

FOREIGN PATENT DOCUMENTS 59-131669 7/1984 Japan .
63156879 12/1986 Japan .
2167426 5/1986 United Kingdom .

*Primary Examiner*—Charles R. Nold
*Attorney, Agent, or Firm*—Anne Gerry Sabourin

[57] ABSTRACT

The subject of the present invention is a process for the production of closures, in which process a sealing composition is applied and baked on the inside of the closures, wherein a sealing composition is applied which contains A) 20 to 95% by weight of at least one compound having on average more than two isocyanate groups per molecule and/or of a diisocyanate prepolymer, the isocyanate groups being blocked,
B) 1.5 to 30% by weight of at least one diamine and/or polyamine,
C) 0 to 78.5% by weight of at least one plastic and/or elastic and/or reactive organic polymer,
D) 0 to 60% by weight of pigments and/or fillers,
E) 0 to 50% by weight of one or more reactive diluents and
F) 0 to 20% by weight of auxiliaries and additives, the sum of the proportions by weight of the components A to F being 100% in each case.

The present invention also relates to the closures produced by the process according to the invention and to packaging containers which contain said closures.

20 Claims, No Drawings

PROCESS FOR THE PRODUCTION OF CLOSURES FOR PACKAGING CONTAINERS

The subject of the present invention is a process for the production of closures for tight sealing of packaging containers, with which process a sealing composition is applied and baked on the inside of the closures.

The invention also relates to closures for packaging containers with which a sealing composition has been applied and baked on the inside, and also packaging containers having said closures.

The purpose of the various packaging materials is the hermetic sealing of the packaged material against environmental influences, specifically also under extreme conditions, such as prevail, for example, during heat sterilization of foodstuffs. In order to ensure this insulation of the packaged materials from the environment, suitable sealing compositions are introduced into lids and closures with which the packaging containers are closed. Commercially, that is to say economically, satisfactory sealing compositions for closures must have a number of critical properties, as a result of which they are highly specialized materials and compositions.

Furthermore, the required properties of the sealing compositions are also determined by the intended use of the packaging.

Thus in the case of foodstuffs packaging it is in particular the stability of the sealing compositions towards the packaged materials during the sterilization or pasteurization and also the storage, which can often extend over a period of several years, of the packaged foodstuffs which is of importance. In the case of industrial packaging, the packaged materials are often chemically highly reactive or aggressive and the sealing compositions must also be able to withstand these. Usually the sealing compositions used for closures and lids of packaging made of glass and metal are sealing compositions consisting of plasticizer-containing PVC plastisols, such as are described, for example, in DE-AS 20 03 693 in the case of closures for glassware.

The PVC plastisols used as sealing composition as a rule consist of a polyvinyl chloride, which can be mixed to a paste and which is distinguished in particular by a defined swelling capacity in the plasticizer, one or more plasticizers and optionally fillers, stabilizers, pigments and polyvinyl chloride processing auxiliaries.

The formulation of plasticizer-containing PVC plastisols, their production and processing is described extensively in K. Weinmann, Beschichten mit Lacken und Kunststoffen, (Coating with varnishes and plastics), 1967, Verlag W.A. Colomb, Stuttgart.

It is known that under the influence of the packaged materials, in particular as a result of fatty and oily substances, and under thermal stress (pasteurization, sterilization) it is, in principle, not possible in the case of such PVC sealing compositions to prevent plasticizer migration from the sealing composition and also incipient dissolution and swelling of the sealing composition in the case of solvent-containing packaged materials.

The degree of plasticizer migration can exceed regulations in foodstuffs legislation which are currently valid and under discussion. Furthermore, under certain circumstances the plasticizer migration causes a loss of vacuum in the case of pasteurized and sterilized packaging and also a loss of solvents as a result of an increased gas permeability in the case of industrial packaging. In the case of industrial packaging, in principle the problem also exists of the contamination of the packaged materials as a result of the plasticizer migration and incipient swelling or dissolution of the polyvinyl chloride. A further disadvantage of these sealing compositions is that the disposal of PVC-containing waste is becoming increasingly problematical and cost-intensive.

In addition to the PVC sealing compositions customarily employed, sealing compositions based on polyurethane are, however, also known. Thus, for example, in U.S. Pat. No. 3,971,785 and in GB Patent 1,374,745 sealing compositions for packaging containers are described which contain—optionally blocked—polyisocyanate prepolymers and carbon dioxide-blocked amines as crosslinking agents. U.S. Pat. No. DE-OS 19 57 827 and U.S. Pat. No. DE-OS 22 03 730 disclose sealing compositions which contain hydroxyl group-containing polymers and polyisocyanates or blocked prepolymers as well as an activator containing hydroxyl-containing polymers and aluminum silicate compounds.

Finally, in German Patent Application P 39 05 5 45.0, which has not yet been published, sealing compositions for closures of packaging containers are described which contain a liquid, blocked diisocyanate, a liquid diamine and/or polyamine as curing agent and also optionally further conventional additives. These sealing compositions are distinguished by an exceptionally low migration in the case of solvent-containing and/or fat-containing packaged materials. The migration characteristics with respect to aqueous packaged materials are, however, in need of improvement.

The object on which the present invention was based was thus to provide a process for the production of closures for tight sealing of packaging containers, with which process the sealing compositions applied to the insides of the closures display, compared with the customarily used sealing compositions based on PVC plastisols, no plasticizer migration, that is to say the sealing compositions should have as low as possible a migration rate with respect to solvent-containing and/or fat-containing packaged materials. In addition, the sealing compositions should, however, also have as low as possible a migration of other constituents of the sealing material into the packaged material. In the case of foodstuff packaging, the sealing composition should be stable and not migrate into the packaged material, especially under the conditions of sterilization and pasteurization. For industrial packaging, stability to chemicals is demanded in particular.

At the same time, it should be possible to carry out the process as simply as possible and with only a low expenditure. Thus, it should be possible to process the sealing compositions on the same application equipment as the conventional PVC plastisols. For problem-free handling, the system should be a solvent-free thermoreactive one-component system with good storage stability. Finally, the sealing compositions should also have a good adhesion to the closure, which can either be coated with a coating composition customary in the packaging industry or can be uncoated.

Surprisingly, this object is achieved by means of a process for the production of closures for tight sealing of packaging containers, with which process a sealing composition is applied and baked on the inside of the closures. The process comprises applying a sealing composition which contains A) 20 to 95% by weight of at least one compound having on average more than two isocyanate groups per molecule and/or of a prepolymer based on a diisocyanate and a chain-lengthening agent, the isocyanate groups being blocked,
B) 1.5 to 30% by weight of at least one diamine and/or polyamine,
C) 0 to 78.5% by weight of at least one plastic and/or elastic and/or reactive organic polymer,
D) 0 to 60% by weight of pigments and/or fillers,
E) 0 to 50% by weight of one or more reactive diluents and
F) 0 to 20% by weight of auxiliaries and additives, the sum of the proportions by weight of the components A to F being 100% in each case.

The present invention also relates to the closures produced by the process according to the invention and packaging containers containing said closures.

Now, it is true that U.S. Pat. No. DE-OS 16 44 813 discloses stoving coatings built up on the basis of blocked toluylene diisocyanate and amine crosslinking agents, but this publication gives no indication of the use of the stoving coatings as sealing composition. Those skilled in the art are also not given any indication with regard to solving the object on which the present application is based. The object on which U.S. Pat. No. DE-OS 16 44 813 was based was, rather, to provide a process for the production of coating solutions which are stable on storage.

Furthermore, the product information "Desmodur ® BL 1100" from Bayer discloses that films having a rubber-elastic character are obtained using said isocyanate "Desmodur ® BL 1100"—a liquid, blocked aromatic polyisocyanate—in combination with cycloaliphatic diamines as reactants. However, this publication also neither gives an indication of the use of such systems as sealing compositions in the production of closures for packaging containers nor gives indications to the average person skilled in the art with regard to solving the object on which the present application is based. On the contrary, the poor stability of the coatings to solvents, which is mentioned in this publication, speaks against the use of such systems as sealing compositions for closures for packaging containers.

In the text which follows, the sealing compositions employed in the process according to the invention are now first explained in more detail.

Compounds suitable as component A of the sealing compositions are all compounds having on average more than two isocyanate groups per molecule as well as prepolymers containing at least two NCO groups per molecule, which have been prepared by reaction of a diisocyanate with a chain-lengthening agent, the isocyanate groups of the component A being present not as free groups but in blocked form. Blocked isocyanates which are liquid at room temperature are preferably employed. Furthermore, it must be ensured that in the case of foodstuffs packaging as low as possible a migration rate of the structural components of the isocyanate compound, such as, for example, blocking agents, into the packaged material occurs.

Examples of suitable blocking agents for component A are, in particular, compounds which are acceptable from the standpoint of foodstuffs legislation, such as, for example, amino acids, cyclized amino acids and sugars, but also, for example, malonic acid and malonic acid esters.

Further possible blocking agents are also oximes, such as, for example, acetoxime, diethylketoxime, acetophenone oxime, cyclohexanone oxime, cyclopentanone oxime, formaldoxime and acetaldoxime, as well as phenols and caprolactams. However, when these blocking agents are used care must be taken that no problems arise as a result of migration of blocking agent residues into the packaged material.

Suitable isocyanate components are all isocyanates for which the form in which they are completely reacted with one of the abovementioned blocking agents is preferably liquid and which lead to systems which preferably have Shore-A hardnesses (DIN 53 505) of between 20 and 80. In addition, the isocyanate component should not be readily volatile at room temperature.

Examples of suitable isocyanates which may be mentioned are dimerized and/or trimerized 2,4- and 2,6-toluylene diisocyanate and dimerized and/or trimerized hexamethylene diisocyanate, optionally as a mixture with small amounts of toluylene diisocyanate or hexamethylene diisocyanate monomer. Chain-lengthened diisocyanates, in particular chain-lengthened toluylene diisocyanate or hexamethylene diisocyanate, are also suitable. The chain-lengthening agents used are diols and/or triols and/or polyols, as well as mixtures of diols with triols and/or polyols. Preferably, dimerized and/or trimerized toluylene diisocyanate or toluylene diisocyanate chain-lengthened using a diol and/or triol is employed.

Component A is employed in the sealing compositions in an amount of 20 to 95% by weight, preferably 50 to 90% by weight, in each case based on the total weight of the sealing composition.

Compounds (component B) which are suitable for crosslinking the blocked isocyanates and which are employed in an amount of 1.5 to 30% by weight, preferably 1.5 to 20% by weight, in each case based on the total weight of the sealing composition, are diamines and/or polyamines, in particular liquid cycloaliphatic diamines, such as, for example, 4,4-diamino-3,3-dimethyldicyclohexylmethane, 4,4-diaminodicyclohexylmethane, polyoxypropylenetriamine having an average molecular weight $M_w$ of 400 to 450 and also liquid polyaminoamides, such as, for example, the commercial product "Versamid 100" from Schering AG and liquid polyaminoamides prepared by a condensation reaction of fatty acid dimers and trimers with aliphatic amines, and also amines having a low melting point. The amino groups in the amino compounds employed are primary and/or secondary.

The sealing agents can also optionally contain at least one plastic and/or elastic and/or reactive organic liquid and/or pulverulent polymer as a further constituent. This component C is employed in the sealing compositions in an amount of 0 to 78.5% by weight, preferably of 8.5 to 30% by weight, in each case based on the total weight of the sealing composition.

Examples of suitable modifying agents (component C) are styrene/butadiene copolymers, styrene/butadiene/styrene rubber, polyethylene homopolymers and copolymers, ethylene/vinyl acetate copolymers, vinyl acetate/ethylene copolymers, polystyrene, polyvinyl alcohols, polyamides, acrylate polymers, nitrile rubbers, polyurethane precondensates, epoxide resins, polyesters, sugars and the like, with the exception of polyvinyl chloride.

The properties of the sealing compositions, such as, for example, the flexibility, can be controlled in a targeted manner by means of the choice of the nature and amount of these modifying agents. However, this is known to those skilled in the art and the most favorable nature and amount of these modifying agents in a particular case can be determined easily with the aid of a few routine experiments.

As a further constituent, the sealing compositions also contain 0 to 60% by weight, preferably 0 to 30% by weight, in each case based on the total weight of the sealing composition, of pigments and/or fillers, such as, for example, titanium dioxide, synthetic iron oxide, organic pigments, such as, for example, phthalocyanines, tartrazines, ultramarine blue, Pigment Yellow 83, Pigment Orange 43, Pigment Orange 5 or Pigment Red 4, as well as magnesium silicates and aluminum silicates, amorphous and pyrogenous silica, barium sulfate, carbon black, talc, kaolin and chalk (component D).

For adjustment to a viscosity favorable for the application, the sealing compositions can also contain 0 to 50% by weight, preferably 0 to 20% by weight, in each case based on the total weight of the sealing composition, of one or more reactive diluents (component E).

Examples of suitable compounds are preferably polyfunctional amines, in particular cycloaliphatic diamines, such as, for example, cyclohexylpropylenediamine and the like.

In addition, however, polyols, such as, for example, propylene glycol and diethylene glycol, and also reactive oils, such as, for example, OH group-containing vegetable oils, can also be used as reactive diluents. However, they have the disadvantage of a lower reactivity compared with polyamines. Finally, the sealing compositions employed according to the invention can also contain 0 to 20% by weight, preferably 0 to 8% by weight, based on the total weight of the sealing compositions, of further auxiliaries and additives (component F). Examples of such compounds are slip agents for adjusting the torque to the correct values in the case of closures which have to be screwed on or twisted on. Suitable slip agents include fatty acids, such as stearic acid and oleic acid, silicone oils, such as dimethylpolysiloxane and methylhydrogenopolysiloxane. Further compounds which can be employed as component F are waxes and silicas, in order to obtain specific flow properties (agents for rendering thixotropic) and, in the case of foamed sealing compositions, propellants, such as, for example, azodicarbonamides or sulfohydrazides.

For use in glassware closures and bottle closures, the sealing compositions are employed mainly in the form of foamed sealing compositions. In general, foaming of the sealing compositions gives rise to a lowering of the Shore A hardness (measured in accordance with DIN 53 505), an increase in the flexibility, a more favorable weight/volume ratio and the achievement of a better sealing function as a result of a better deformability.

The sealing compositions are produced by mixing the individual components, the insoluble constituents, for example pigments, optionally first being added to the component A and—if necessary—being dispersed using the dispersing units customary in the coatings industry. In the case of the production of non-foamed sealing compositions, the mixing or dispersing is usually carried out under vacuum. The sealing compositions produced in this way generally have Shore A hardnesses (DIN 53 505) of between 20 and 80, preferably between 25 and 70.

The amount of the sealing compositions applied depends on the geometry of the closure part, the intended use of the packaging and on whether the sealing composition is foamed or not.

For production of the closures by the process according to the invention, the sealing compositions described above are applied on the inside of the closures, preferably using the known so-called "flow-in process". With this process the sealing composition is pressed or sprayed at slightly elevated temperature, usually about 40° C., in the uncured pasty state from one or more nozzles into the closure parts, which are rotated at a high speed of rotation with the inside facing upwards on a suction cup or the like. The sealing composition is converted into the desired shape and form as a result of the centrifugal forces. After this flowing-in is complete, curing of the sealing compositions takes place at temperatures of between 170° C. and 230° C. for a drying time of 1 to 5 min. The drying and the equipment employed for this are likewise known and therefore do not need to be explained in more detail here.

Closures to be coated with the sealing composition are understood to be all parts of the packaging material which are in contact with the body of the packaging, for example crown corks, for example for beer, fruit juice and lemonade bottles, aluminum and plastic screw closures for bottles and glassware and also further closures customary in the packaging industry for cans, tubs, barrels and the like. These closures can be made of metals, such as aluminum, black plate, tin plate and various iron alloys, which are optionally provided with a passivation coating based on nickel, chromium and tin compounds. With the process according to the invention, the sealing composition can be applied to uncoated or coated closures. Suitable coating agents are coatings based on epoxide/phenolic resin, based on acrylate resin and based on polyester or organosols, which are customary in the packaging industry. However, these coatings are known (compare, for example, H. Kittel, Lehrbuch der Lacke and Beschichtungen, Band IV, Lack- und Beschichtungssysteme, (Textbook of varnishes and coatings, volume IV, varnish and coating systems, formulation), Verlag W.A. Colomb at H. Heenemann GmbH, Berlin-Oberschwandorf 1976) and therefore do not have to be described in more detail here.

In addition to the one-coat coatings, two-coat coatings with a primer based on epoxy/phenolic resin and an organosol, polyester or acrylate top coat are also employed, in particular for acid-containing packaged materials and for meat as packaged material.

The closures produced by the process according to the invention have, in particular, the advantage that, compared with the conventional PVC sealing compositions, the sealing compositions display no plasticizer migration and have a good stability to solvents and chemicals, good stability under the conditions of pasteurization and sterilization and also a good adhesion, in particular to coated substrates but also to uncoated conventional substrates.

In the text which follows the invention is illustrated in more detail with reference to illustrative embodiments. Unless expressly stated otherwise, all data in respect of parts and percentages relate to data by weight.

The sealing compositions A to F are first produced from the components indicated in Table 1, by mixing. Using an 8 mm DIN cup, the viscosity (on the basis of DIN standard 53 211) and the Shore A hardness (DIN standard 53 505) of test pieces are measured for these coating compositions A to F. The results of these tests are also shown in Table 1.

To study the migration characteristics of the sealing compositions according to the invention compared with sealing compositions based on PVC plastisols, the sealing composition E was first applied to a metal sheet in a coating thickness which corresponds to the normal weight applied in closures (compare Tables 6 to 10) and cured for 5 min at 190° C. For the migration tests, in each case 1 cm² surface area of the sealing composition was brought into contact with 2 ml of the test solution. The migrating amounts of foreign substances were determined as global migrates in the form of the dry residues. The chloroform-soluble fraction of the dry residues was also determined. The results of these tests are shown in Table 3. The migrates were also examined qualitatively and quantitatively for organically bonded nitrogen, phenol, formaldehyde and heavy metals. The results are compiled in Table 4.

In addition, a sensory test was also carried out by allowing in each case 10 ml or 2 ml of various test solutions (tap water, mineral water, apple juice) to act on, in each case, 1 cm² surface area of the sealing composition under the conditions indicated in Table 4. The test solutions were tested against blank solutions, which had not been in contact with the sealing material, by several test persons independently of one another in a three-cornered test. The assessment was carried out on the basis of DIN 10 955. The test results are shown in Table 5.

For comparison, the sealing composition V based on a plasticizer-containing PVC plastisol was also tested analogously to the sealing compositions A to E. The composition of this sealing composition V is shown in Table 2 and the test results are shown in Tables 3 to 5.

The sealing compositions are also tested with respect to their stability, adhesion characteristics and sealing effect when used in crown corks (compare Table 6 and 7), bottle twist caps (compare Table 8) and glassware closures (compare Tables 9 and 10) under diverse stress (for example sterilization). For this purpose, the sealing composition is first applied in the particular indicated amount using an automated spraying machine customary in the packaging container industry and dried for 5 min at 190° C. In order to test the properties in the case of foodstuffs packaging, the particular containers (bottles, glassware and the like, depending on the closure part) are filled with various test solutions (water, 3% strength sodium chloride solution, 2% strength sodium chloride solution and 3% strength acetic acid solution, 1 and 2% strength lactic acid solution, 4% strength oxalic acid solution and a solution of 0.5 g of cysteine in 1 l of water) and sterilized for 45 min at 125° C. The stability of the sealing composition, adhesion and sealing effect are then tested and assessed.

The individual test methods are now explained in more detail below:

Adhesion Test

The sealing composition is slit slightly and an attempt is made to remove the sealing composition manually:
good adhesion: sealing composition can be removed only with destruction
usable adhesion: sealing composition can be lifted off in the form of a ring or in fragments with considerable effort (high resistance)
poor adhesion: easy removal of the sealing composition from the coated or uncoated closure

Sealing Function Test

A check is made to determine whether the vacuum has remained intact or whether packaged material issues following the stress.

Quality Test

An assessment is made to determine whether the sealing composition has remained sound and/or is brittle, cracked or swollen or the substrate (sheet metal) is visible.

TABLE 1

| Sealing compositions tested | | | | | | |
|---|---|---|---|---|---|---|
| | A | B | C | D | E | F |
| Isodyanate[1] | 92 | 92 | 74.5 | 76 | 69.6 | 68.2 |
| Polyamine[2] | 8 | 7 | 6 | 6 | 5.5 | 5.4 |
| Titanium dioxide | — | — | 0.8 | 0.8 | 0.7 | 0.7 |
| Barium sulfate | — | — | 7.3 | 7.6 | 7.0 | 6.9 |
| Aluminum silicate | — | — | 7.4 | 8.6 | 8.0 | 7.8 |
| Dimethyl-polysiloxane ($M_w > 100$) | — | — | 4 | — | — | 2.0 |
| Azodicarbonamide, 50% strength in propylene glycol | — | 1 | — | 1.0 | — | — |
| Propylene glycol | — | — | — | — | 9.2 | 9.0 |
| Viscosity (s)[3] | 110 | 100 | 130 | 130 | 50 | 50 |
| Shore A hardness | 55 | 30–35 | 65 | 35 | 50–55 | 50–55 |

[1] = Commercially available polyisocyanate blocked with ε-caprolactam (commercial product Desmodur ® BL 1100 from Bayer AG)
[2] = 4,4 diamino-3,3-dimethyldicyclohexylmethane
[3] Measured in an 8 mm DIN cup at 40° C.

TABLE 2

Composition of a sealing composition V based on a plasticizer-containing PVC plastisol 43.0 parts of polyvinyl chloride (PVC) having a K value of 70[1]
31.5 parts of dioctyl phthalate
7.7 parts of epoxidized soya oil
1.5 parts of octyl fatty acid ester
1.0 parts of titanium dioxide
8.8 parts of barium sulfate
3.1 parts of aluminum silicate
0.4 parts of calcium stearate/zinc stearate
1.7 parts of fatty acid amide
1.3 parts of silicone oil

[1] Determined in accordance with DIN 53 726

TABLE 3

| Results of the migration tests | | | | |
|---|---|---|---|---|
| | Sealing composition V | | Sealing composition E | |
| | DR[1] | CF[2] | DR | CF |
| Dist. water 10 d 40° C. | 4.4 | 1.4 | 15.1 | 4.1 |
| 3% acetic acid 10 d 40° C. | 3.5 | 1.3 | 7.7 | 4.3 |
| 15% ethanol 10 d 40° C. | 3.2 | 1.9 | 38.8 | 8.2 |
| n-heptane 2 h/50° C. | — | — | 53.1 | 17.4 |
| 2 h/65° C. | 778 | 761 | — | — |

[1] DR: Dry residue of the migrate (mg/100 cm²)
[2] CF: Chloroform-soluble fraction of dry residue (mg/100 cm²)

TABLE 4

| Tests on the migrates (2 h 70° C.) | | | |
|---|---|---|---|
| | | Sealing composition | |
| Substance tested | Test solution | V | E |
| Organically | Distilled water | 0.16 | 1.8 |

TABLE 4-continued

Tests on the migrates (2 h 70° C.)

| Substance tested | Test solution | Sealing composition V | E |
|---|---|---|---|
| bonded nitrogen (mg/100 cm²) | 3% acetic acid | 0.15 | 2.3 |
|  | 15% ethanol | 0.13 | 1.5 |
| Phenol | Distilled water | n.d.[1] | n.d. |
|  | 3% acetic acid | n.d. | n.d. |
| Formaldehyde | Distilled water | n.d. | n.d. |
|  | 3% acetic acid | n.d. | n.d. |
| Lead, arsenic, antimony | Distilled water | n.d. | n.d. |
|  | 3% acetic acid | n.d. | n.d. |
| Zinc | Distilled water | n.d. | n.d. |
|  | 3% acetic acid | 0.07 | n.d. | n.d. = not detectable

TABLE 5

Results of the sensory test

| | | V | A | B | C | D | E | F |
|---|---|---|---|---|---|---|---|---|
| Tap water 10 d 40° C. | Appearance | 0/0 | 0/0 | 0/0 | 0/0 | 0/0 | 0/0 | 0/0 |
|  | Odor | 0/0 | 0/0 | 0/0 | 0/0 | 0/0 | 0/0 | 0/0 |
|  | Taste | 0/0 | 0/0 | 0/0 | 0/0 | 0/0 | 0/0 | 0/0 |
| Mineral water 10 d 40° C. | Appearance | 0/0 | 0/0 | 0/0 | 0/0 | 0/0 | 0/0 | 0/0 |
|  | Odor | 0/0 | 0/0 | 0/0 | 0/0 | 0/0 | 0/0 | 0/0 |
|  | Taste | 0/0 | 0/0 | 0/0 | 0/0 | 0/0 | 0/0 | 0/0 |
| Apple juice 2 h 50° C. | Appearance | 0/0 | 0/0 | 0/0 | 0/0 | 0/0 | 0/0 | 0/0 |
|  | Odor | 0/0 | 0/0 | 0/0 | 0/0 | 0/0 | 0/0 | 0/0 |
|  | Taste | 0/0 | 0/0 | 0/0 | 0/0 | 0/0 | 0/0 | 0/0 |

[1]: 0 = no detectable deviation; 1 = just detectable deviation, 2 = slight deviation, 3 = distinct deviation, 4 = severe deviation; first value indicated: 10 ml of test solution/cm², second value indicated = 2 ml of test solution/cm²

TABLE 6

Characteristics of sealing composition B for crown corks after pasteurization (30 min, 90° C.)

| Example | 1 | 2 | 3 | 4 | 5 | 6 |
|---|---|---|---|---|---|---|
| Sealing composition | B | B | B | B | B | B |
| Substrate | ECCS[1] | ECCS | ECCS | TP[2] | TP | TP |
| Primer | uncoated | EP[3] | O[4] | uncoated | EP | O |
| Amount of sealing composition applied (g) | 0.5 | 0.5 | 0.5 | 0.5 | 0.5 | 0.5 |
| Quality | i.o. | i.o. | i.o. | i.o. | i.o. | i.o. |
| Adhesion | good | good | good | good | good | good |
| Vacuum | i.o.[5] | i.o. | i.o. | i.o. | i.o. | i.o. |

[1] ECCS = "Electrolytic chromium - coated steel" (chrome-plated steel)
[2] TP = "tin plated" = tin plate E 2.8/2.8 (DIN 1616)
[3] EP = Adhesive coating based on epoxy/phenolic resin
[4] O = Organosol adhesive coating
[5] i.o. = in order

TABLE 7

Characteristics of sealing composition D for crown corks after pasteurization (30 min, 90° C.)

| Example | 7 | 8 | 9 | 10 | 11 | 12 |
|---|---|---|---|---|---|---|
| Sealing composition | D | D | D | D | D | D |
| Substrate | ECCS[1] | ECCS | ECCS | TP[2] | TP | TP |
| Primer | uncoated | EP[3] | O[4] | uncoated | EP | O |
| Amount of sealing composition applied (g) | 0.5 | 0.5 | 0.5 | 0.5 | 0.5 | 0.5 |
| Quality | i.o. | i.o. | i.o. | i.o. | i.o. | i.o. |
| Adhesion | good | good | good | good | good | good |
| Vacuum | i.o.[5] | i.o. | i.o. | i.o. | i.o. | i.o. |

[1] ECCS = "Electrolytic chromium - coated steel" (chrome-plated steel)
[2] TP = "tin plated" = tin plate E 2.8/2.8 (DIN 1616)
[3] EP = Adhesive coating based on epoxy/phenolic resin
[4] O = Organosol adhesive coating
[5] i.o. = in order

TABLE 8

Characteristics of the sealing compositions in bottle twist caps after pasteurization (30 min, 95° C.)

| Example | 13 | 14 | 15 | 16 |
|---|---|---|---|---|
| Sealing composition | C | C | F | F |
| Substrate | aluminum | aluminum | aluminum | aluminum |
| Primer | O[1] | 2C[2] | O | 2C |
| Amount of sealing composition applied (g) | 0.5 | 0.5 | 0.5 | 0.5 |
| Quality | i.o.[3] | i.o. | i.o. | i.o. |
| Adhesion | good | good | good | good |
| Vacuum | i.o. | i.o. | i.o. | i.o. |

[1] O = Organosol adhesive coating
[2] 2C = 2-coat coating build-up: primer epoxy/phenolic resin coating, top coat organosol
[3] i.o. = in order

TABLE 9

Characteristics of the sealing compositions of glassware closures after sterilization (45 min, 125° C.)

| Example | 17 | 18 | 19 | 20 | 21 | 22 |
|---|---|---|---|---|---|---|
| Sealing composition | C | C | C | C | C | C |
| Substrate | TFS[1] | TFS | TP[2] | TP | Al[3] | Al |
| Primer | O[4] | 2C[5] | O | 2C | O | 2C |
| Amount of sealing composition applied (g) | | | | | | |
| φ 65 mm | 1.0 | 1.0 | 1.0 | 1.0 | 1.0 | 1.0 |
| φ 76 mm | 1.5 | 1.5 | 1.5 | 1.5 | 1.5 | 1.5 |
| Quality | i.o.[6] | i.o. | i.o. | i.o. | i.o. | i.o. |
| Adhesion | good | good | good | good | good | good |
| Vacuum | i.o. | i.o. | i.o. | i.o. | i.o. | i.o. |

[1] TFS = "tin free steel"
[2] TP = "tin plated" = tin plate E 2.8/2.8 (DIN 1616)
[3] Al = Aluminum
[4] O = Organosol adhesive coating
[5] 2C = 2-coat coating build-up: primer = epoxy/phenolic resin coating; top coat = organosol
[6] i.o. = in order

TABLE 10

Characteristics of the sealing compositions in glassware closures after sterilization (45 min, 125° C.)

| Example | 23 | 24 | 25 | 26 | 27 | 28 | 29 | 30 | 31 |
|---|---|---|---|---|---|---|---|---|---|
| Sealing composition | E | E | E | E | E | E | F | F | F |
| Substrate | TFS[1] | TFS | TP[2] | TP | Al[3] | Al | TFS | TP | Al |
| Period | O[4] | 2C[5] | O | 2C | O | 2C | 2C | 2C | 2C |
| Amount of sealing composition applied (g) | | | | | | | | | |
| φ 65 mm | 1.0 | 1.0 | 1.0 | 1.0 | 1.0 | 1.0 | 1.0 | 1.0 | 1.0 |
| φ 76 mm | 1.5 | 1.5 | 1.5 | 1.5 | 1.5 | 1.5 | 1.5 | 1.5 | 1.5 |
| Quality | i.o.[6] | i.o. | i.o. | i.o. | i.o. | i.o. | i.o. | i.o | i.o. |
| Adhesion | good | good | good | good | good | good | good | good | good |

TABLE 10-continued

| | Characteristics of the sealing compositions in glassware closures after sterilization (45 min, 125° C.) | | | | | | | | |
|---|---|---|---|---|---|---|---|---|---|
| Example | 23 | 24 | 25 | 26 | 27 | 28 | 29 | 30 | 31 |
| Vacuum | i.o. | i.o. | i.o. | i.o. | i.o. | i.o. | i.o. | i.o. | i.o. |

[1] TFS = "tin free steel"
[2] TP = "tin plated" = tin plate E 2.8/2.8 (DIN 1616)
[3] Al = Aluminum
[4] O = Organosol adhesive coating
[5] 2C = 2-coat coating build-up: primer = epoxy/phenolic resin coating; top coat = organosol
[6] i.o. = in order

We claim:

1. A process for the production of closures for tight sealing of food packaging containers, with which process a sealing composition is applied and baked on the inside of the closures, wherein a sealing composition is applied which contains
   A) 20 to 95% by weight of at least one compound selected from the group consisting of compounds having on average more than two isocyanate groups per molecule and prepolymers based on a diisocyanate and a chain-lengthening agent, and mixtures thereof, the isocyanate groups being blocked in each case,
   B) 1.5 to 30% by weight of at least one compound selected from the group consisting of diamines and polyamines and mixtures thereof,
   C) 0 to 78.5% by weight of at least one polymer selected from the group consisting of plastic, elastic, and reactive organic polymers and mixtures thereof,
   D) 0 to 60% by weight of compounds selected from the group consisting of pigments and fillers and mixtures thereof,
   E) 0 to 50% by weight of one or more reactive diluents and
   F) 0 to 20% by weight of auxiliaries and additives,
   the sum of the proportions by weight of the components A to F being 100% in each case.

2. The process as claimed in claim 1, wherein the sealing composition comprises
   A) 50 to 90% by weight of at least one compound selected the group consisting of compounds having on average more than two isocyanate groups per molecule and prepolymers based on a diisocyanate and a chain-lengthening agent, and mixtures thereof, the isocyanate groups being blocked in each case,
   B) 1.5 to 20% by weight of at least one compound selected from the group consisting of diamines, polyamines and mixtures thereof,
   C) 8.5 to 30% by weight of at least one polymer selected from the group consisting of plastic, elastic, and reactive organic polymers and mixtures thereof,
   D) 0 to 30% by weight of compounds selected from the group consisting of pigments and fillers and mixtures thereof,
   E) 0 to 20% by weight of one or more reactive diluents and
   F) 0 to 8% by weight of auxiliaries and additives,
   the sum of the proportions by weight of the components A to F being 100% in each case.

3. The process as claimed in claim 1, where component B is selected from the group consisting of 4,4 diamino-3,3-dimethyldicyclohexylmethane, polyoxypropylenetriamine having an average molecular weight $M_w$ of 400–450 and mixtures thereof.

4. The process as claimed in claim 1, wherein liquid isocyanates are employed as component A.

5. The process as claimed in claim 1, wherein compounds based on toluylene diisocyanate are employed as component A.

6. The process as claimed in claim 1, wherein polyamines are employed as component E.

7. The process as claimed in claim 1, wherein the closure is first coated with a coating before the sealing composition is applied and baked.

8. A closure for packaging containers, which has been prepared by a process of claim 1.

9. A packaging container having a closure in which a sealing composition is applied and baked on the inside of the closure, wherein the sealing composition contains
   A) 20 to 95% by weight of at least one compound selected from the group consisting of compounds having on average more than two isocyanate groups per molecule and prepolymers based on a diisocyanate and a chain-lengthening agent, and mixtures thereof, the isocyanate groups being blocked in each case,
   B) 1.5 to 30% by weight of at least one compound selected from the group consisting of diamines and polyamines and mixtures thereof,
   C) 0 to 78.5% by weight of at least one polymer selected from the group consisting of plastic, elastic, and reactive organic polymers and mixtures thereof,
   D) 0 to 60% by weight of compounds selected from the group consisting of pigments and fillers and mixtures thereof,
   E) 0 to 50% by weight of one or more reactive diluents and
   F) 0 to 20% by weight of auxiliaries and additives,
   the sum of the proportions by weight of the components A to F being 100% in each case.

10. The packaging container as claimed in claim 9, wherein the sealing composition comprises
    A) 50 to 90% by weight of at least one compound selected from the group consisting of compounds having on average more than two isocyanate groups per molecule and prepolymers based on a diisocyanate and a chain-lengthening agent, and mixtures thereof, the isocyanate groups being blocked in each case,
    B) 1.5 to 20% by weight of at least one compound selected from the group consisting of diamines, polyamines and mixtures thereof,
    C) 8.5 to 30% by weight of at least one polymer selected from the group consisting of plastic, elastic, and reactive organic polymers and mixtures thereof, D) 0 to 30% by weight of compounds selected from the group consisting of pigments and fillers and mixtures thereof, E) 0 to 20% by weight of one or more reactive diluents and F) 0 to 8% by weight of auxiliaries and additives, the sum of the proportions by weight of the components A to F being 100% in each case.

11. The packaging container as claimed in claim 9, wherein component B is selected from the group consisting of 4,4 diamino-3,3-dimethyldicyclohexylmethane, polyoxypropylenetriamine having an average molecular weight $M_w$ of 400–450 and mixtures thereof.

12. The packaging container as claimed in claim 9, wherein liquid isocyanates are employed as component A.

13. The packaging container as claimed in claim 9, wherein compounds based on toluylene diisocyanate are employed as component A.

14. The packaging container or packaging container as claimed in claim 9, wherein polyamines are employed as component E.

15. The packaging container as claimed in claim 9, wherein the closure is first coated with a coating before the sealing composition is applied and baked.

16. A process for the production of closures for tight sealing of food packaging containers, with which process a sealing composition is applied and baked on the inside of the closures, wherein a sealing composition is applied which contains A) 50 to 95% by weight of at least one compound selected from the group consisting of compounds having on average more than two isocyanate groups per molecule and of a prepolymer based on a diisocyanate and a chain-lengthening agent, and mixtures thereof, the isocyanate groups being blocked in each case, B) 1.5 to 20% by weight of at least one compound selected from the group consisting of diamines, polyamines and mixtures thereof, C) 0 to 78.5% by weight of at least one polymer selected from the group consisting of plastic, elastic, and reactive organic polymers, D) 0 to 60% by weight of compounds selected from the group consisting of pigments and fillers, E) 0 to 50% by weight of one or more reactive diluents and F) 0 to 20% by weight of auxiliaries and additives, the sum of the proportions by weight of the components A to F being 100% in each case.

17. The process as claimed in claim 1, wherein liquid polyamines are employed as component B.

18. The process as claimed in claim 1, wherein liquid isocyanates are employed as component A and liquid polyamines are employed as component B.

19. The packaging container as claimed in claim 9, wherein liquid polyamines are employed as component B.

20. The packaging container as claimed in claim 9, wherein liquid isocyanates are employed as component A and liquid polyamines are employed as component B.

* * * * *